United States Patent [19]

Hayashida

[11] Patent Number: 5,016,181

[45] Date of Patent: May 14, 1991

[54] METHOD AND SYSTEM FOR AN ENGINE IGNITION TIMING CONTROL

[75] Inventor: Yuji Hayashida, Tokyo, Japan

[73] Assignee: Fuji Jukogyo Kabushiki Kaisha, Tokyo, Japan

[21] Appl. No.: 372,656

[22] Filed: Jun. 28, 1989

[30] Foreign Application Priority Data

Jul. 5, 1988 [JP] Japan .................................. 63-168171

[51] Int. Cl.$^5$ ................................................ F02P 5/04
[52] U.S. Cl. ........................... 364/431.09; 364/431.05; 123/493; 123/423
[58] Field of Search ..................... 364/431.03, 431.04, 364/431.05, 431.08, 431.09; 123/325, 333, 334, 419, 423, 446, 489, 493, 417, 325, 329

[56] References Cited

U.S. PATENT DOCUMENTS

| | | | |
|---|---|---|---|
| 4,337,512 | 6/1982 | Furuhashi | 364/431.04 |
| 4,371,050 | 2/1983 | Ikeura | 364/431.09 |
| 4,373,489 | 2/1983 | Yamaguchi | 123/423 |
| 4,434,759 | 3/1984 | Iezuka et al. | 123/325 |
| 4,437,442 | 3/1984 | Yamaguchi | 123/325 |
| 4,639,870 | 1/1987 | Otobe et al. | 364/431.04 |
| 4,698,765 | 10/1987 | Abe et al. | 364/431.04 |

Primary Examiner—Parshotam S. Lall
Assistant Examiner—Michael Zanelli
Attorney, Agent, or Firm—Beveridge, DeGrandi & Weilacher

[57] ABSTRACT

An ignition timing control system of an engine comprises an ignition timing correction quantity memory device for storing an ignition timing correction quantity, an ignition timing correction quantity retrieving device for retrieving the ignition timing correction quantity during a delay time from the ignition timing correction quantity memory device in accordance with engine speed, and an ignition timing calculating device for computing and correcting the ignition timing during the delay time on the basis of the ignition timing correction quantity.

7 Claims, 4 Drawing Sheets

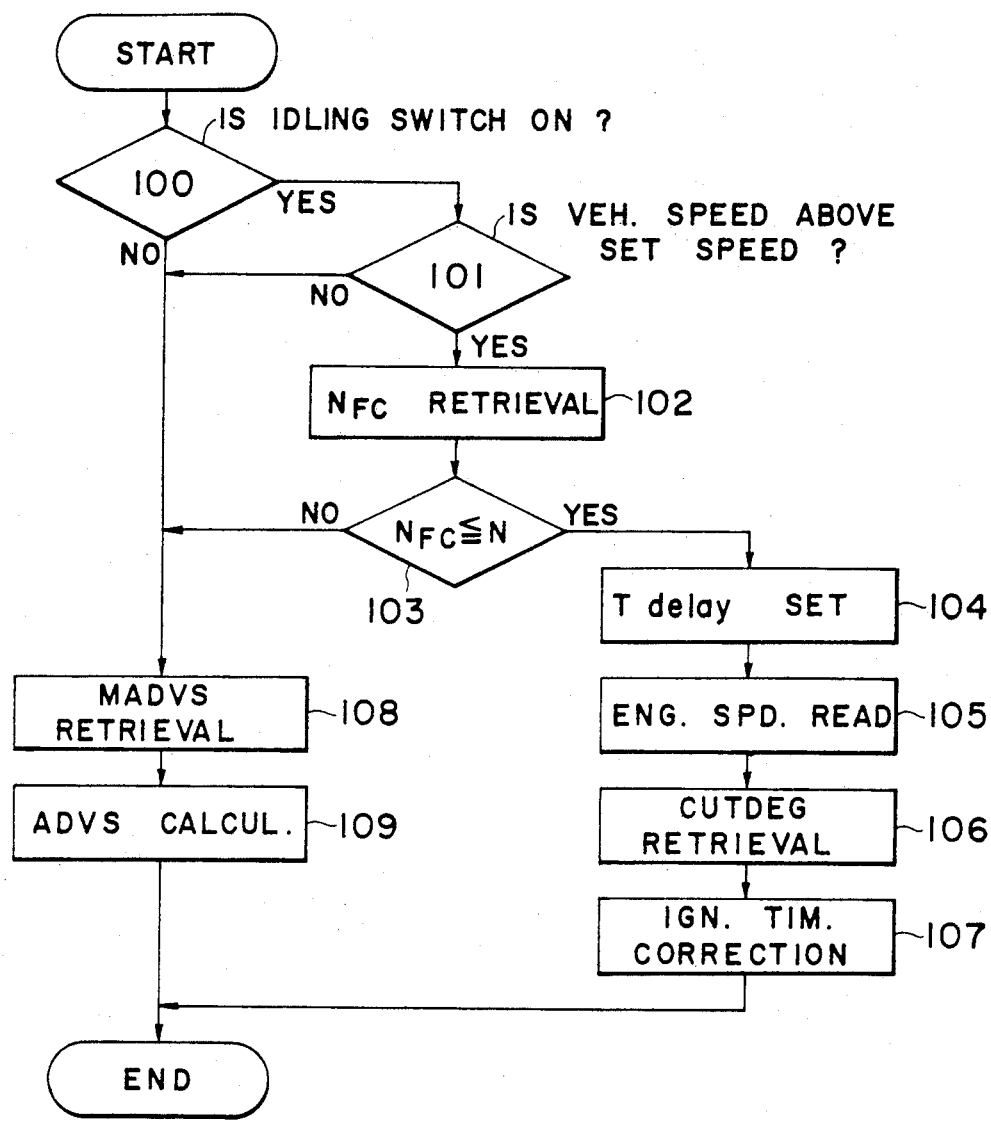
FIG. 4
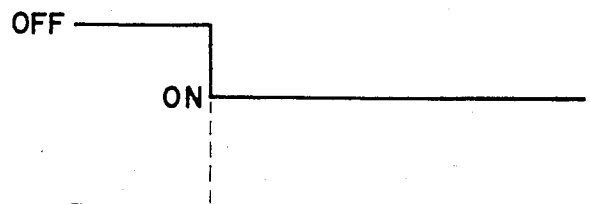
FIG. 5(a) IDLING SWITCH
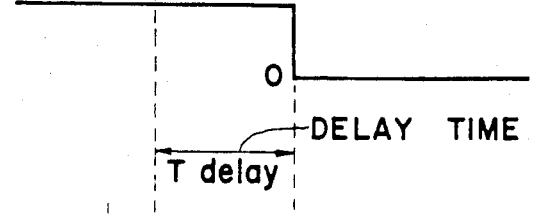
FIG. 5(b) FUEL INJEC. QUANT. Ti
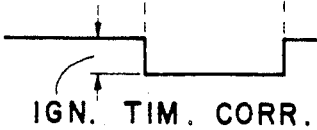
FIG. 5(c) IGN. TIMING

METHOD AND SYSTEM FOR AN ENGINE IGNITION TIMING CONTROL

BACKGROUND OF THE INVENTION

The present invention relates to a control system of ignition timing for internal combustion engines and more particularly to a method and system for ignition timing control of the engine. The control system controls the ignition timing of the engine at the time of fuel cutting with a time delay when engine speed is decelerating.

Therefore, in an automotive vehicle, it has been practiced to control an air-fuel ratio and the ignition timing by a feedback control to purify the exhaust gas. In order to save fuel and to protect a catalyst converter during deceleration of the vehicle, it has also been a practice to cut the fuel supply. If this fuel cut-off is carried out abruptly, the engine torque deviates easily from a correct value. By the inverse torque from the road, the engine torque becomes a negative torque, whereby an abrupt fluctuation occurs in the torque. As a consequence of this torque fluctuation, there has been a possibility of troubles at the time of deceleration of the vehicle speed such as intermittent abnormal vibrations or a sudden drop in the engine speed which causes a stall of the engine.

In order to prevent such a defective operation due to the fuel cut-off at the time of engine deceleration, a delay or retardation time is provided while the fuel is cut-off. Such a technique has been disclosed in, for example, Japanese Patent Laid Open Publication No. 170830/1983. By this known technique, the deceleration is detected on the basis of output signals of an engine rotation sensor and a throttle valve opening degree sensor. In accordance with the output signals of the two sensors, the start of the fuel cut-off is computed and controlled by a controller.

However, until the fuel is cut at the time of deceleration, the ignition timing remains unchanged. For this reason, insufficient combustion of the fuel occurs because of a delay in the ignition timing and causes a variation in an air-fuel ratio or a rise in intake negative pressure. As a consequence, there has been a problem of deterioration of the purification of the exhaust gas due to the emission of unburned gas.

SUMMARY OF THE INVENTION

It is an object of the present invention to provide an ignition timing system of an engine by which: the ignition timing during a delay time before fuel cut-off at a time of engine deceleration operation is controlled; discharging of incompletely burned exhaust gas is prevented; and at the same time an abrupt fluctuation of the engine torque and vibrations at the time of deceleration are prevented.

According to the present invention, there is provided an ignition timing control system of an engine. The system comprises engine control means having delay time setting means for setting a delay time to cut fuel, which is carried out at the time of deceleration operation of the engine. The system is also provided with: ignition timing correction quantity memory means for storing an ignition timing correction quantity; ignition timing correction quantity retrieving means for retrieving the ignition timing correction quantity during the delay time from the ignition timing correction quantity memory means in dependency on engine speed; and ignition timing computing means for computing and correcting the ignition timing during said delay time in dependency on said ignition timing correction quantity retrieved. In the operation of this engine ignition timing control system: a delay time is provided for cutting the fuel at the time of deceleration operation; during this delay time, the ignition timing correction quantity is retrieved from the ignition timing correction quantity memory means by correcting the ignition timing quantity in dependency on the engine speed; and the ignition timing is computed and corrected during the delay time by the ignition timing calculating means.

The nature, utility, and further features of the present invention will be more clearly understood from the following detailed description referring to the accompanying drawings.

BRIEF DESCRIPTION OF THE DRAWINGS

FIG. 4 is a flow chart indicating the operation of the ignition timing control system; and FIGS. 5(*a*), 5(*b*), and 5(*c*) are time charts indicating relationships between time and operations of an idling switch, a fuel injection quantity and an ignition timing.

DETAILED DESCRIPTION OF THE INVENTION

Figure 1:
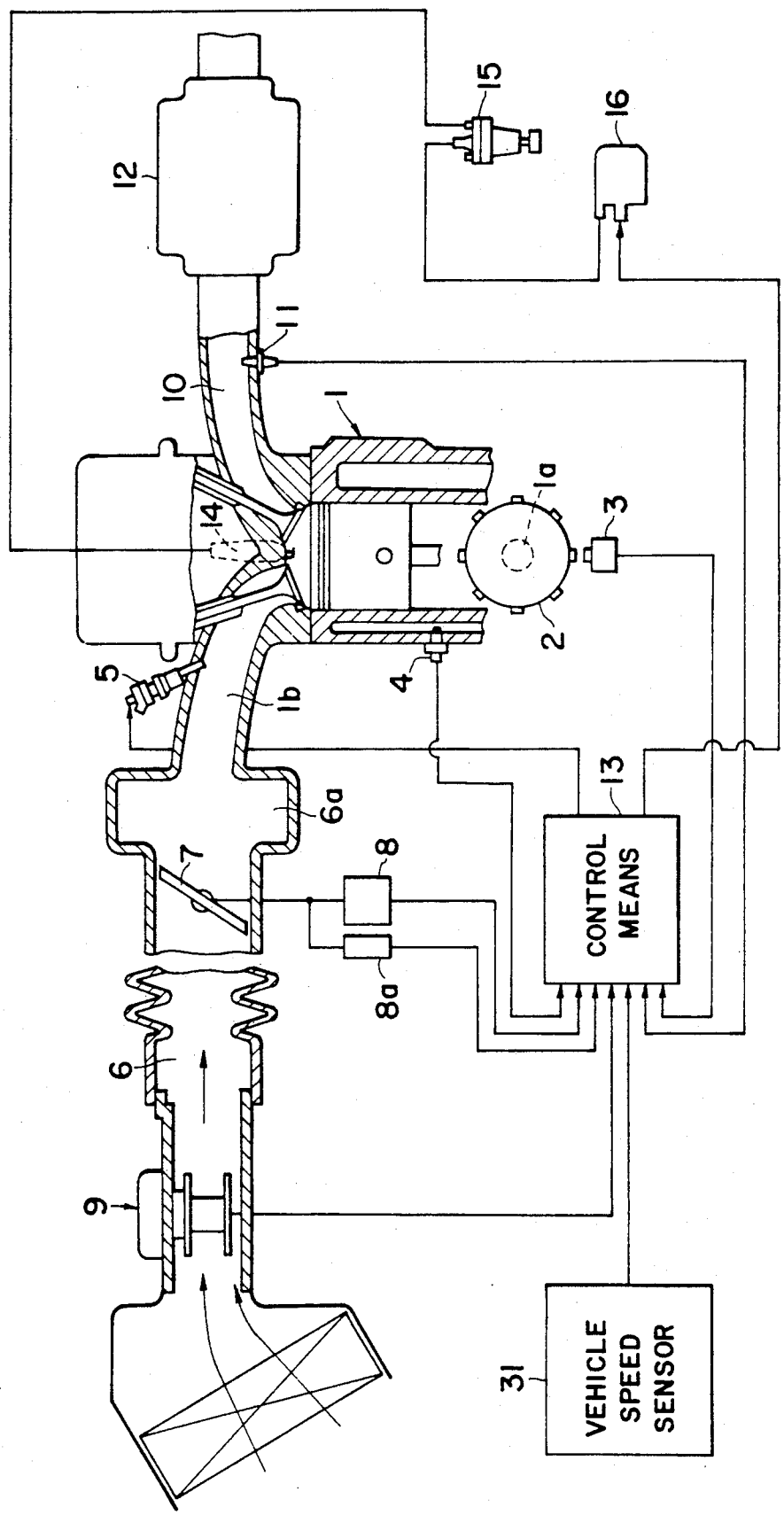
FIG. 1 is schematic diagram of an engine and an ignition timing control system of the present invention.

Referring to FIG. 1 numeral 1 represents a cylinder block of an engine. A crankshaft disc 2 is fixed coaxially to a crankshaft la and is confronted at its periphery by a crank angle sensor 3. A coolant temperature sensor 4 is mounted on a water jacket of the cylinder 1.

Furthermore, a fuel injector 5 is mounted to inject fuel into an intake port 1*b* of the engine. In an intake passage 6 communicatively connected to an upstream end of the intake port 1*b* is installed a throttle valve 7. Just downstream the throttle valve 7, the intake passage 6 forms an air chamber 6*a*. A throttle position sensor 8 and an idling switch 8*a* are connected to a shaft of the throttle valve 7. The idling switch 8*a* is turned ON when the throttle valve 7 is fully closed, and is turned OFF when the throttle valve 7 is at any other position. In the intake passage 6 at an upstream position thereof, an air flow meter 9 is installed.

In an exhaust gas passage 10 of the engine is installed an $O_2$ sensor 11. Downstream the $O_2$ sensor 11 is installed a catalyst converter 12.

An ignition timing is controlled by control means 13. The control means 13 receives output signals respectively from the air flow meter 9, the throttle position sensor 8, the idling switch 8*a*, the water temperature sensor 4, the crank angle sensor 3, the $O_2$ sensor 11 and a vehicle speed sensor 31. In dependency on these input signals, the control means 13 outputs a control signal for actuating the injector 5 to control an air-fuel ratio and a control signal for actuating an ignition coil 16 connected via a distributor 15 to a spark plug 14 of a cylinder to control current supply timing and duration of the current supply.

Figure 2:
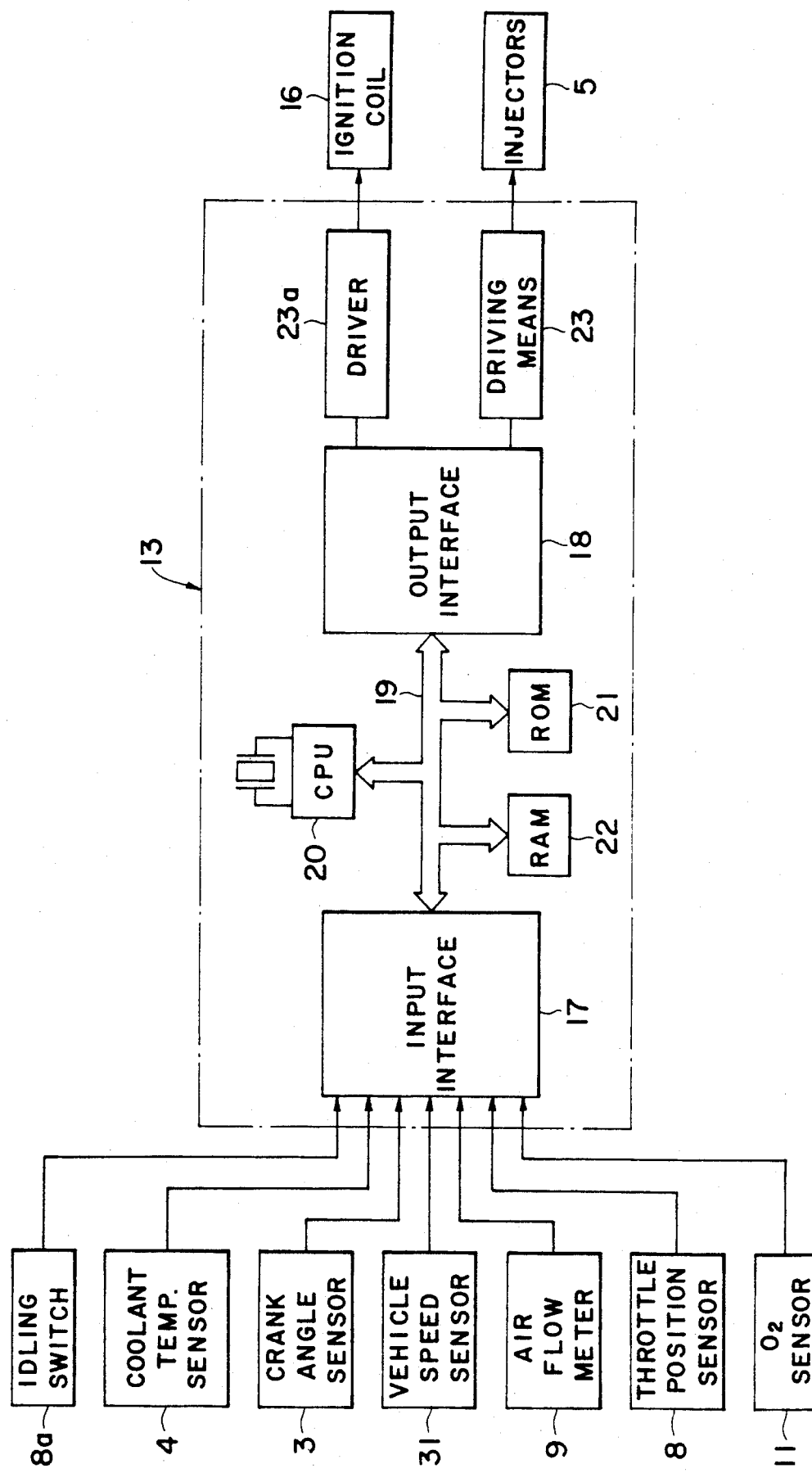
FIG. 2 is a block diagram of an electronic control system.

As shown in FIG. 2, the control means 13 comprises an input interface 17, an output interface 18, a central processing unit (CPU) 20, a ROM 21, a RAM 22 and a bus line 19 interconnecting these components. For controlling the ignition timing at the time of deceleration, the signals respectively of the idling switch 8a, the coolant temperature sensor 4, the crank angle sensor 3 and the vehicle speed sensor 31 are received through the input interface 17 in the control means 13, which carries out computation and processing the data.

In the ROM 21 fixed data for controlling a program are stored. In the RAM 22 the output signals of the sensors after processing data are temporarily stored in specific addresses. The CPU 20 operates to calculate the ignition timing from the various data stored in the RAM 22 in dependency on the program stored in the ROM 21. And the CPU 20 calculates the delay time of the fuel-cut by detecting the deceleration state of the vehicle, and outputs an ignition signal and a fuel cutting signal through the output interface 18 to driver 23a and injector driving means 23. This injector driving means 23 is connected to the injectors 5 installed at respective cylinders. A driver 23a is connected to the primary winding of the ignition coil 16.

Figure 3:
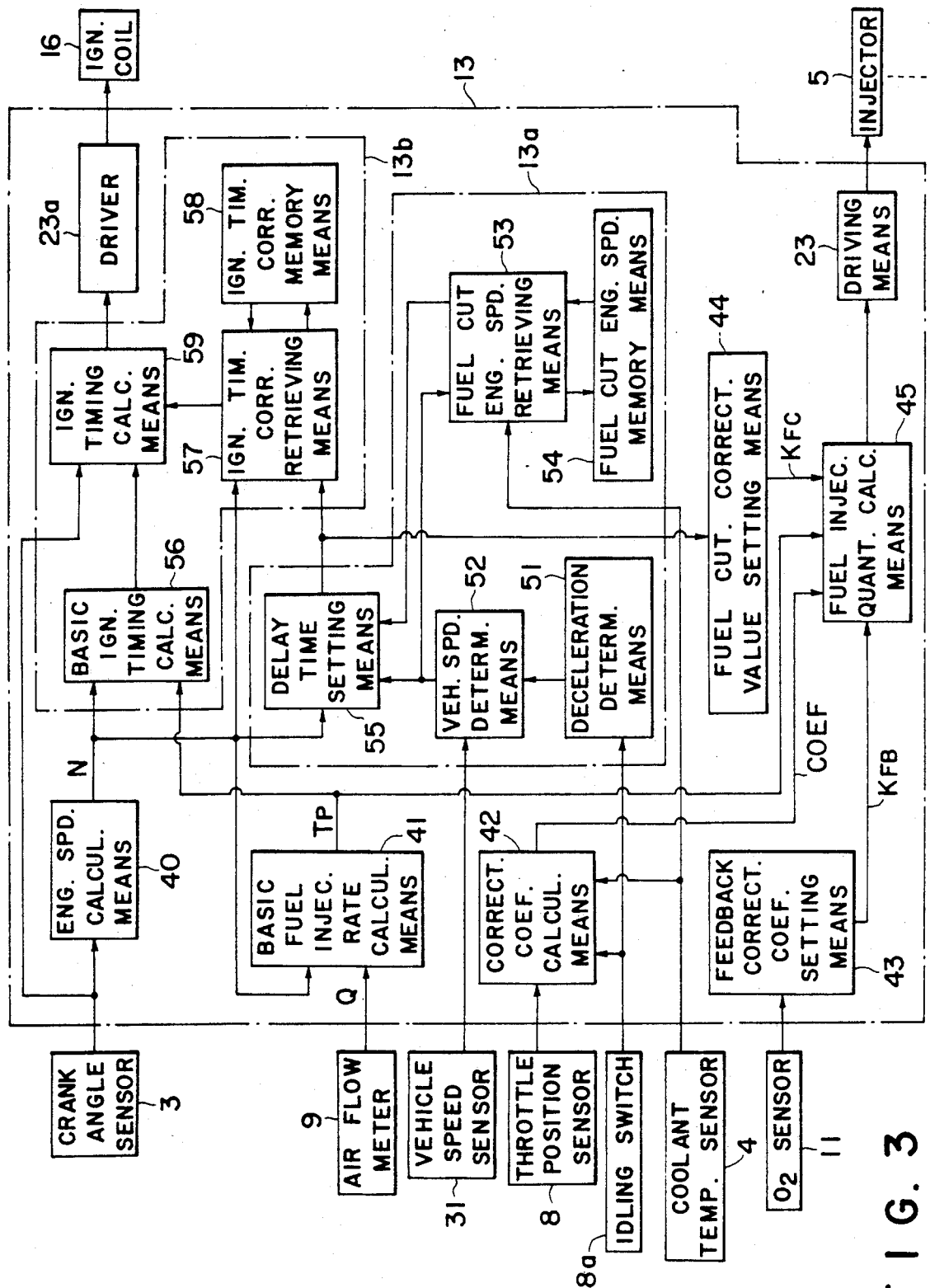
FIG. 3 is a block diagram of the ignition timing control system.

As shown in FIG. 3, the control means 13 comprises engine speed calculating means 40, basic fuel injection rate calculating means 41, air-fuel ratio correction coefficient calculating means 42, air-fuel ratio feedback correction coefficient setting means 43, fuel cutting correction value setting means 44, fuel injection quantity calculating means 45, an ignition timing calculating section 13b, a fuel cutting decision section 13a and the driver 23a and driving means 23.

The engine speed calculating means 40 calculates a engine speed N from the output signal of the crank angle sensor 3. In the basic fuel injection rate calculating means 41, a basic fuel injection quantity Tp is calculated from the engine speed N and an intake air quantity Q based on the output signal of the air flow meter 9. That is, Tp is calculated as
Tp = K Q/N , where K is a constant.

In the air-fuel ratio correction coefficient calculating means 42, an air-fuel ratio correction coefficient COEF after idling, a throttle full-open correction, a coolant temperature correction, and an acceleration/deceleration correction are calculated from the output signals of the idling switch 8a, the coolant temperature sensor 4, and the throttle position sensor 8. In the air-fuel ratio feedback correction coefficient setting means 43, a feedback correction coefficient $K_{FB}$ is set according to an output Waveform of the $O_2$ sensor 11.

On the other hand, the fuel cutting correction setting means 44 operates on the basis of a delay time setting means 55 in the fuel cutting decision section 13a described in detail hereinafter so as to set a fuel cutting correction value $K_{FC}$ at zero ($K_{FC}=0$) when the fuel cutting conditions are satisfied and the delay time has elapsed. And, at the other times the fuel cutting correction setting means sets this value $K_{FC}=1$.

In the fuel injection quantity calculating means 45, the basic fuel injection quantity Tp calculated in the basic fuel injection rate calculating means 41 is corrected by; the air-fuel ratio correction coefficient COEF calculated in the air-fuel ratio correction coefficient calculating means 42; the feedback correction coefficient $K_{FB}$ set in the air-fuel ratio feedback correction coefficient setting means 43; and the fuel cutting correction value $K_{FC}$ set in the fuel cutting correction setting means 44. Then a fuel injection quantity Ti is calculated. Ti is determined as follows.

$$Ti = Tp \times COEF \times K_{FB} \times K_{FC} \qquad (1)$$

The calculated fuel injection quantity Ti is transmitted as output through the injector driving means 23 to the fuel injector 5.

The function of the ignition timing control system at the time of deceleration will now be described.

As described above, the control means 13 is provided with a fuel cutting decision section 13a and an ignition timing calculating section 13b. The former section 13a comprises deceleration determination means 51, vehicle speed determination means 52, fuel cut engine speed retrieving means 53, fuel-cut engine speed memory (storing) means 54, and delay time setting means 55. The ignition timing calculating section 13b comprises a basic ignition timing calculating means 56, ignition timing correction quantity retrieving means 57, ignition timing correction quantity memory (storing) means 58, and ignition timing calculating means 59.

By detecting the ON/OFF state of the idling switch 8a, the deceleration deciding means 51 determines whether or not the vehicle is in a state of deceleration, wherein the idling switch 8a has shifted from OFF to ON and transmits its output to the vehicle speed determination means 52.

The vehicle speed determination means 52 operates to determine whether or not the vehicle speed data from the vehicle speed sensor 31 indicates a vehicle speed exceeding a set speed in dependency on the output. When the vehicle is decelerating and, the vehicle speed data indicates a speed exceeding the set speed, the vehicle speed determination means 52 transmits an output to the fuel-cut engine speed retrieving means 53, indicating the retrieval of the fuel-cut engine speed. And at the same time the vehicle speed determination means 52 transmits the output to the delay time setting means 55, which transmits an output to the fuel cutting correction value setting means 44.

The fuel-cut engine speed retrieving means 53 operates to retrieve the fuel-cut engine speed which satisfies the fuel cutting conditions corresponding to the coolant temperature detected by the water temperature sensor 4 from the fuel cutting engine speed memory means 54 in dependency on the output of the vehicle speed determination means 52 and the fuel-cut engine speed retrieving means 54 transmits an output to the delay time setting means 55.

The fuel cutting engine speed memory means 54 is included in the ROM 21. The fuel-cut engine speed memory means 54 has a map of the engine speed with the coolant temperature as a parameter. By experimentation, the minimum engine speed necessary for not producing an adverse effect is determined even when fuel cutting is carried out with the coolant temperature as a parameter. The minimum speed as the fuel-cut engine speed is stored in the ROM 21 as the map with the coolant temperature as a parameter.

The delay time setting means 55, upon receiving the output of the vehicle speed determination means 52, compares the engine speed signal from the engine speed calculating means 40 with the fuel-cut engine speed from the fuel cutting engine speed retrieving means 53 and determines whether the fuel-cut conditions are satisfied. When these conditions are satisfied, the delay time setting means 55 sets the delay time from the shifting of the idling switch 8a from OFF to ON to the start of the fuel-cut and transmits the output to the ignition timing correction quantity retrieving means 57. In addition, a fuel-cut signal is transmitted to the fuel cutting correction value setting means 44 when the fuel cut conditions are still being satisfied even after the time delay.

Accordingly, the setting means 44, sets the fuel cutting correction value $K_{FC}$ at zero ($K_{FC}=0$) after the time delay until the fuel-cut conditions are satisfied. As a result, during this interval, the fuel injection quantity Ti calculated by the fuel injection quantity calculating means 45 becomes zero (Ti=0) according to the equation (1), and the fuel-cut is carried out, as indicated in FIGS. 5(a) and 5(b).

On the other hand, the basic ignition timing calculating means 56 operates to determine the basic ignition timing by the retrieving map in dependency on the engine speed N calculated by the engine speed calculating means 40 and the engine load data according to the basic fuel injection quantity Tp calculated by the basic fuel injection quantity calculating means 41. The output is transmitted to the ignition timing calculating means 59.

Furthermore, the ignition timing correction quantity retrieving means 57 operates to retrieve the ignition timing correction quantity during the delay time of the fuel cutting corresponding to the engine speed N at that time from the ignition timing correction quantity memory means 58 in dependency on the output from the delay time setting means 55 and the ignition timing correction quantity retrieving means 57 transmits the output to the ignition timing calculating means 59.

The ignition timing correction quantity memory means 58, is included in the ROM 21 and is constituted as a table corresponding to the engine speed. By experimentation, the ignition timing correction quantity for an optimum ignition timing is decided with consideration of the ignition delay corresponding to an air-fuel ratio variation and a rise of intake negative pressure when the throttle valve is fully closed, and the value is determined with respect to the engine speed as a parameter. The ignition timing correction quantity is stored as a table in the ROM 21.

In the ignition timing calculating means 59, the actual ignition timing is calculated in dependency on the crank angle signal from the crank angle sensor 3 with respect to the basic ignition timing from the basic ignition timing calculating means 56. At the same time, the ignition timing correction quantity from the ignition timing correction quantity retrieving means 57 is applied. And the output is transmitted to the driver 23a, from which an ignition signal is transmitted to the ignition coil 16, as indicated by the time chart shown in FIG. 5(c).

The process of controlling the ignition timing at the time of vehicle deceleration according to the present invention will now be described with reference to the flow chart shown in FIG. 4.

First, at a step 100, whether a signal from the idling switch 8a is ON or OFF is determined in the deceleration determination means 51. When this signal is OFF, it is judged that the vehicle is being driven normally, and the process advances to a step 108. Then, in a basic ignition timing calculating means 56, a basic ignition timing MADVS is determined by a retrieving map in dependency on the engine speed and the engine load according to the basic fuel injection quantity. Then, at a step 109, with respect to this basic ignition timing MADVS, an actual ignition timing ADVS is calculated by the ignition timing computing means 59 in dependency on the crank angle signal from the crank angle sensor 3. Thus a regular or normal ignition timing control is carried out.

On the other hand, when the idling switch 8a is in its ON state, the driving condition is determined to be that of deceleration, and the process proceeds from the step 100 to a step 101. At the step 101, it is determined whether or not the present vehicle speed exceeds a preset speed (for example, 5 km/h) from the signal of the vehicle speed sensor 31 in the vehicle speed determination means 52. When the present vehicle speed is less than the preset speed, a fuel-cut is not carried out, and the regular ignition timing control is carried out similarly at the steps 108 and 109. When the vehicle speed exceeds the preset speed, the process advances to a step 102 for determining whether or not the fuel-cut conditions are satisfied. Then, in the fuel-cut engine speed retrieving means 53, the fuel-cut engine speed $N_{FC}$ corresponding to the coolant temperature is retrieved from the map provided in the fuel cutting engine speed memory means 54 in dependency on the coolant temperature signal from the coolant temperature sensor 4.

From the step 102, the process advances to a step 103. In the delay time setting means 55, the fuel-cut engine speed $N_{FC}$ and the present engine speed N from the engine speed calculating means 40 are compared. Then it is determined whether the fuel-cut conditions are satisfied. When the present speed N is lower than the fuel-cut speed $N_{FC}$, it is judged that the fuel-cut conditions are not satisfied. In this case, the delay time setting means 55 is so reset that a fuel cutting signal for the fuel cutting correction value setting means 44 is not generated. The normal ignition is then calculated in the steps 108 and 109.

In this case, a fuel cutting signal is not introduced into the fuel cutting correction value setting means 44 from the delay time setting means 55. For this reason, the fuel-cut correction value $K_{FC}$ is set as $K_{FC}=1$. As a result, in the fuel injection quantity calculating means 45, the fuel injection quantity Ti is calculated from the equation (1). That is, $Ti = Tp \times COEF \times K_{FB}$ (where: Tp is the basic fuel injection quantity; COEF is the air-fuel ratio correction coefficient; and $K_{FB}$ is in the air-fuel ratio feedback correction coefficient). Regular air-fuel ratio control is then carried out.

On the other hand, when the present engine speed N is higher than the fuel-cut engine speed $N_{FC}$, it is judged that fuel cutting is to be carried out. Thus, at a step 104, a delay time $T_{delay}$ up to the start of the fuel-cut is set according to the engine speed N at that time. The process then proceeds to a step 105. This delay time $T_{delay}$ is set at a small value in a high engine speed range and at a large value in the low engine speed range.

In this case, after the delay time $T_{delay}$, the fuel-cut conditions are still being satisfied, the fuel-cutting correction value $K_{FC}$ is set at zero ($K_{FC}=0$) in the fuel-cut correction value setting means 44 in the time interval in which the fuel-cut signal is transmitted from the delay time setting means 55 to the fuel cutting correction value setting means 44 up to the time when the fuel-cut conditions become unsatisfied. And the fuel-cut signal from the delay time setting means 55 is stopped. By this procedure, during this time interval, the fuel injection quantity Ti calculated in the fuel injection quantity calculating means 45 becomes zero (Ti=0) from the equation (1). Thus, the operation of the injectors 5 is stopped, and the fuel injection stops, as indicted in FIGS. 5(a) and 5(b).

At a step 105, the engine speed N is read in the ignition timing correction quantity retrieving means 57. At a succeeding step 106, an ignition timing correction quantity CUTDEG is retrieved from a table stored in the ignition timing correction quantity memory means 58 and is transmitted to the ignition timing computing means 59. This quantity CUTDEG is stored in the ignition timing correction quantity memory means 58 as an optimum advance angle or retardation angle corresponding to the engine speed such that. As described hereinbefore, the ignition timing takes an optimum value, which prevents an ignition delay due to the air-fuel ratio variation and the rise in intake negative pressure at the time when the throttle valve is fully closed. This quantity CUTDEG is used to correct the ignition timing during the time delay $T_{delay}$ of the fuel cutting.

At succeeding step 107, the correction of the ignition timing correction quantity CUTDEG is applied to the ignition timing ADVS computed in the ignition timing computing means 59. On the basis of the ignition timing corrected, the ignition signal is transmitted by driver 23a to the ignition coil 16. The primary winding of the ignition coil 16 is cut, and the distributor 15 causes sparking of the spark plug 5 of a specific cylinder.

The fuel cutting during deceleration is carried out by the control process described above according to the present invention. During this process, the time delay $T_{delay}$ up to the start of the fuel cutting is set. Moreover, during the lapse of this delay time $T_{delay}$, the ignition timing is corrected and controlled by the ignition timing correction quantity for preventing the sparking delay due to the variation in the air-fuel ratio and the rise in intake negative pressure as mentioned hereinbefore. Therefore, torque fluctuations of the engine accompanying the fuel cutting are prevented, and at the same time stable combustion in the engine cylinders is maintained.

If, during the lapse of the delay time $T_{delay}$ of the fuel cutting, the idling switch 8a turns OFF, the delay time setting means 55 will be reset, and the control system will immediately shift to the regular ignition timing control and regular air-fuel ratio control.

Furthermore, in the above described example, the basic fuel injection quantity is used as an engine load data for determining the basic ignition timing. However, instead of the basic fuel injection quantity, the output signal of a sensor such as the throttle position sensor or an intake pipe pressure sensor may be used.

As described above, the present invention provides the engine ignition timing system by which the time delay is provided for the fuel cutting at the time of deceleration driving, and during this time delay the ignition timing is controlled so as to be continually optimal. As a result, vibrations of the vehicle body due to fluctuations of the engine torque occurring when the fuel supply is abruptly cut at the time of the deceleration are prevented. At the same time, insufficient combustion due to the variation in the air-fuel ratio is prevented, and deterioration of the purification of the exhaust gas during deceleration driving is prevented.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An ignition timing control system of an engine having a throttle valve, an idling switch producing a switch signal when the throttle valve is fully closed, a crank angle sensor provided to detect an engine speed, a vehicle speed sensor provided to detect a vehicle speed of a vehicle, a coolant temperature sensor provided to detect an engine temperature, engine load detecting means for detecting an engine load, calculating means responsive to the engine speed and the engine load for calculating an optimum ignition timing, driving means for generating an ignition signal to spark an ignition plug at the optimum ignition timing, and fuel supplying means for supplying a fuel to the engine in dependency on variable operation conditions of the engine, comprising:

determining means responsive to the switch signal, the vehicle speed and the engine temperature for determining a fuel-cut state;

setting means for setting a delay time in response to the engine speed and for producing a fuel-cut signal when said delay time is lapsed after said determining means determines the fuel-cut state;

correcting means for correcting the optimum ignition timing with a predetermined correction value corresponding to the magnitude of the engine speed during said delay time so as to provide a corrected ignition timing to the driving means; and fuel-cut means responsive to said fuel-cut signal for cutting off the supply of the fuel to the engine.

2. The system according to claim 1, wherein said determining means comprises:

a first determining section responsive to the switch signal for determining a deceleration condition of the vehicle;

a second determining section for determining a low vehicle speed condition when the vehicle speed is lower than a preset vehicle speed; and a third determining section for determining a fuel-cut engine speed condition when the engine speed is larger than a preset engine speed.

3. The system according to claim 2, wherein said third determining section comprises:

a map storing a plurality of preset engine speeds; and a retrieving section for retrieving one of said preset engine speeds in response to the engine temperature.

4. The system according to claim 1, wherein said fuel supplying means comprises:

a basic fuel injection rate calculating means responsive to the operation conditions of the engine for calculating a basic fuel injection rate;

$O_2$ sensor for detecting a condition of an air-fuel ratio;

a feedback correction coefficient setting section responsive to an output signal from said $O_2$ sensor for setting a feedback correction coefficient for correcting the air-fuel ratio;

a fuel injection quantity calculating section responsive to said basic fuel injection rate and said feedback correction coefficient for calculating a fuel injection quantity; and a driving section for driving an injector mounted on the engine to inject a fuel corresponding to said fuel injection quantity.

5. An ignition timing control method of an engine having a throttle valve, an idling switch producing a switch signal when the throttle valve is fully closed, a crank angle sensor provided to detect an engine speed, a vehicle speed sensor provided to detect a vehicle speed, a coolant temperature sensor provided to detect an engine temperature, engine load detecting means for detecting an engine load, driving means for generating an ignition signal to spark an ignition plug at the optimum ignition timing, and fuel supplying means for supplying a fuel to the engine in dependency on variable operation conditions of the engine, said method comprising the steps of:

determining a fuel-cut state in response to the switch signal, the vehicle speed, the engine speed and the engine temperature;

calculating an optimum ignition timing in response to the engine speed;

setting a delay time in response to the engine speed;

correcting the optimum ignition timing with a predetermined correction value corresponding to the magnitude of the engine speed during said delay time so as to provide a corrected ignition timing to the driving means;

producing a fuel-cut signal when said delay time is lapsed after the determination of the fuel-cut state; and cutting off the supply of the fuel to the engine in response to said fuel-cut signal whereby an abrupt fluctuation in the torque is avoided.

6. The method according to claim 5, wherein said determining step comprising the steps of:

determining a deceleration condition of a vehicle in response to the switch signal;

determining a low vehicle speed condition when the vehicle speed is lower than a preset vehicle speed; and determining a fuel-cut engine speed condition when the engine speed is larger than a preset engine speed.

7. The method according to claim 6, wherein said fuel-cut engine speed condition determining step comprising the step of setting said preset engine speed in response to engine temperature.

* * * * *